United States Patent [19]

Shimizu

[11] 4,149,379
[45] Apr. 17, 1979

[54] MOTOR VEHICLE POWER ASSISTED BRAKING SYSTEM

[75] Inventor: Kazuaki Shimizu, Fujisawa, Japan

[73] Assignee: Nissan Motor Company, Limited, Yokohama, Japan

[21] Appl. No.: 790,011

[22] Filed: Apr. 22, 1977

[30] Foreign Application Priority Data

Apr. 23, 1976 [JP] Japan .................... 51-47072

[51] Int. Cl.² .................... F15B 1/02; F15B 20/00
[52] U.S. Cl. .................... 60/404; 60/413; 60/582
[58] Field of Search .................. 60/403, 404, 413, 582, 60/548, 430; 91/28; 137/109; 251/62

[56] References Cited

U.S. PATENT DOCUMENTS

| 3,540,218 | 11/1970 | Finn | 60/430 |
|---|---|---|---|
| 3,677,007 | 7/1972 | Goscenski | 60/548 |
| 3,712,176 | 1/1973 | Meyers | 91/6 |
| 3,719,044 | 3/1973 | Bach | 60/404 |
| 3,887,049 | 6/1975 | Ito et al. | 192/4 A |
| 3,898,809 | 8/1975 | Baker | 60/404 |
| 3,995,529 | 12/1976 | Bach et al. | 60/404 X |
| 4,034,566 | 7/1977 | Suketomo et a. | 60/413 X |
| 4,036,106 | 7/1977 | Athy | 60/413 X |

FOREIGN PATENT DOCUMENTS

| 2157010 | 5/1973 | Fed. Rep. of Germany | 60/404 |
|---|---|---|---|
| 2534240 | 2/1976 | Fed. Rep. of Germany | 60/582 |
| 2237787 | 2/1975 | France | 60/403 |

Primary Examiner—Edgar W. Geoghegan
Attorney, Agent, or Firm—Schwartz, Jeffery, Schwaab, Mack, Blumenthal & Koch

[57] ABSTRACT

In the case of pump failure a spool valve instantly connects a pressurized fluid accumulator with the servo motor which assistingly activates the master cylinder and isolates a power steering mechanism fluidly connected to the servo motor so that only the power brake is temporarily operable but with stepwise decreasing effectiveness.

9 Claims, 3 Drawing Figures

MOTOR VEHICLE POWER ASSISTED BRAKING SYSTEM

BACKGROUND OF THE INVENTION

1. FIELD OF THE INVENTION

This invention relates to a power assisted braking system which incorporates a power steering unit and more particularly to a servo motor for same which is fail safe in that it is equipped with a pressure reservoir which can be temporarily used in lieu of the pump should the latter fail.

2. DESCRIPTION OF THE PRIOR ART

As is well known automotive vehicles often utilize a single source of hydraulic fluid under pressure to operate the power brake system as well as other fluid power operated vehicle systems such as the power steering system.

It is also known to apply the brakes directly with the hydraulic fluid under pressure supplied by the pump directly to the brake cylinders of the brakes to initiate the operation of same via a suitable valving system without the interposition of a master cylinder. This system while effective suffers from the drawback that should the supply of fluid under pressure for some reason be cut off due to a malfunction the entire braking system becomes inoperative, and the associated systems such as the power steering lose a great deal of their effectiveness.

Other systems which overcome the above mentioned defect utilize a servo motor which is interposed between the master cylinder of the braking system and the brake pedal or a mechanism directly connected thereto, whereby should the pump fail to supply adequate hydraulic pressure the construction of the servo motor permits direct mechanical operation of the master cylinder. One inherent defect found in all such arrangements where the servo motor is interposed between the master cylinder and the brake is that upon loss of the supply of pressurised fluid from the pump associated therewith, the manual operation of the brakes requires greater physical effort than a normal unassisted braking system. Simultaneously a sudden loss of effective operation of the other power assist system combined with the braking system (fed pressurised fluid from the same pump) is experienced.

To overcome the above mentioned problem it has been proposed to equip the system with a pressurised fluid accumulator, similar to those usually associated with the systems wherein the master cylinder is omitted. However these systems have suffered from undesirable complexity and slowness in changing the supply of pressurised fluid from the pump to the accumulator.

Thus there still remains a need to provide a combined power braking and steering system which is simple in construction, relatively light and preferably comprises several small units interconnectable by conduiting, facilitating deployment within the motor compartment or the like and which is instantly responsive to a loss of fluid pressure from the pump to supply in lieu thereof the accumulated pressurised fluid.

SUMMARY OF THE INVENTION

Hence a power assisted braking system which fullfills the above requirements has been developed in which an accumulator for storing pressurised fluid is connected to the servo motor via a simple valve for immediately connecting the servo motor to the accumulator when the pressure of the fluid from the pump drops below a predetermined level thereby temporarily supplying only the servo motor used for providing the power braking effect and isolating the power steering mechanism which is in turn fluidly connected to the servo motor with and from said pressurised fluid respectively.

Thus it is an object of this invention to provide a power assisted braking system which incorporates a power steering unit and which is equipped with an accumulator for storing pressurised fluid therein, the fluid being usable when the pressure from the pump of the system ceases due to failure of same.

It is another object of this invention to provide a power assisted braking system which incorporates a power steering unit and which is equipped with a pressure accumulator fluidly connected to a servo motor of the above mentioned system through a valve which is sensitive to and through which the pressurised fluid from the pump passes so that on cessation of the supply of pressurised fluid from the pump the valve immediately connects the servo motor with the accumulator whereby normal operation is temporarily maintained.

It is yet another object of this invention to provide a power assisted steering system which incorporates a power steering unit and which has a servo motor operatively connected to the master cylinder of the braking system of the vehicle in which the above mentioned system is employed and a power steering mechanism fluidly connected to the servo motor so that pressurised fluid is fed only into the servo motor and not circulated to the power steering mechanism during pump failure.

BRIEF DESCRIPTION OF THE DRAWINGS

Other features, advantages and objects of this invention will become more apparent as the description proceeds taken in conjunction with the appended drawings in which.

DETAILED DESCRIPTION OF THE PREFERRED EMBODIMENT

Figure 1:
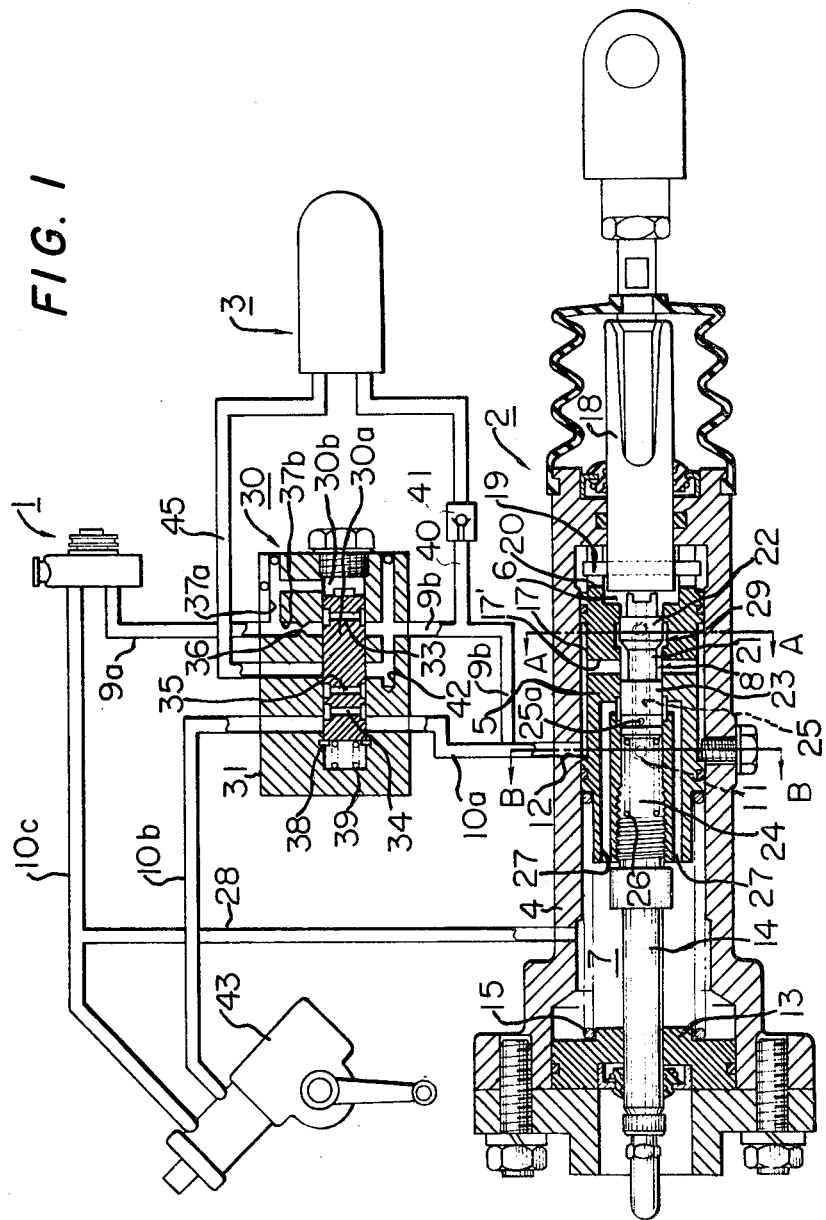
FIG. 1 is a drawing showing the preferred embodiment of the power assisted braking system according to the invention.

FIG. 1 shows a power assisted braking system which incorporates a power steering unit according to the present invention. The numeral 1 denotes a pump which is arranged to deliver fluid under pressure to a servo motor 2 via a spool valve 30, a power steering mechanism via the servo motor and a pressure accumulator 3 connected to the spool valve as will be described later.

Let us now consider the construction of the spool valve 30. Formed within the body of the spool valve is a blind bore (no numeral) which has slidingly disposed therein a spool 30a. Disposed between the blind end of the bore and the spool 30a is a spring 39 which is arranged to urge the spool away from the blind end of said bore. Formed near the blind end of the bore is a stopper 38 which is arranged to limit the amount of travel of the spool against the biasing force of the spring 39. The positioning of this stopper is such that when abutted by the spool, the spool will have assumed what shall be termed hereafter a first predetermined position.

The other end of the spool is arranged to be exposed to a chamber 30b into which the pressurized fluid from the pump is fed via passage 37a, fluidly connected to a conduit 9a interconnecting the pump 1 and the spool valve 30. According to this invention the force exerted by the pressure of the pressurised fluid in the aforementioned chamber is sufficient to overcome the biasing force of the spring 39 and urge the spool into the aforementioned first predetermined position. A restriction 36 is formed in a passage 37b branchedly connected to the passage 37a but downstream of the branching. This arrangement is preferred according to this invention because a pressure representative of the pressure emitted from the pump is constantly maintained in the chamber 30b when the pump is operating normally.

Formed in the spool are three through holes or passages 33, 34 and 35 which are formed to pass at right angles to and through the longitudinal axis of the spool. The first of these passages 33 is arranged as shown to provide communication between the passage 37b and the conduit 9b connected downstream of the spool valve 30 when the spool 30a is in fact in the first predetermined position. The passage connecting the passage 33 with the conduit, 9b is also branched and formed with a passage 42 which is communicable with the last through hole or passage 35 when the spool is urged from the first predetermined position by the spring 39. As will be appreciated when the spool is urged from the first predetermined position so that the end of the spool exposed to the chamber 30b abuts the plug (no numeral) sealingly screwed into a threaded opening of the blind bore it takes a second predetermined position. A conduit 45 is then fluidly connected to the passage 42 via the through hole or passage 35. The conduit 45 is in fact a delivery conduit arranged to deliver pressurised fluid accumulated in the accumulator 3 into the spool valve 30. The accumulator 3 is also fluidly communicated with a conduit 40 in which a check valve 41 is disposed. This conduit is connected to the conduit 9b. The arrangement of the foregoing is such that the pressurised fluid is transmitted through the passage 33 from the pump 1 and is fed simultaneously to the pressure accumulator 3 and the servo motor 2 when the spool is in the first predetermined position, through conduits 40 and 9b respectively. A conduit 10a connects the servo motor and the spool valve 30 for supplying pressurised fluid from the servo motor thereto. A second portion of this conduit, 10b is connected to the spool valve so as to receive the fluid which passes from the conduit 10a through the second passage 34 (the spool being in the first predetermined position) and transmit same to the power steering mechanism 43. A third conduit 10c is arranged to transmit the fluid from the power steering mechanism 43 to the pump 1 for recirculation. When the spool 30a takes the second predetermined position all communication between the servo motor 2 and the power steering mechanism is cut, the through hole or passage 34 being moved to a position preventing the passage of pressurised fluid from the conduit 10a to the conduit 10b through the spool valve. The reason for this will be set forth later in this description.

Figure 2A:
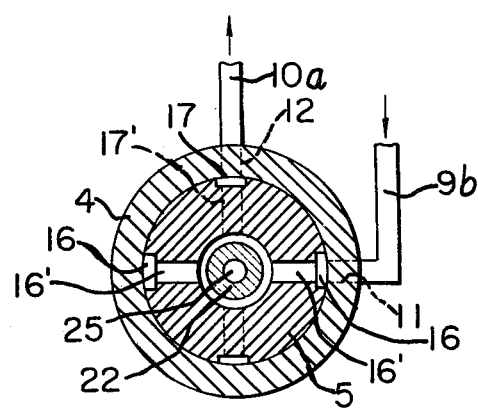
FIG. 2a is a sectional view of the servo motor of the system of FIG. 1 taken along the section line A—A of FIG. 1.

Let us now turn our attention to the servo motor 2. As shown in FIG. 2a the downstream portion of the conduit 9, i.e. 9b, is connected through a port 11 formed in the side of the body or housing 4 of the servo motor. As will be appreciated the port 11 is arranged to introduce the pressurised fluid fed from the spool valve 30 into one of a pair of channel like recesses 16 formed along the side of a piston 5. The recesses are substantially parallel with the longitudinal axis of the piston and extend from the location shown in FIG. 1 (in broken lines) to a bore 16' (seen in FIG. 2a) which is formed through the piston to communicate with a stepped bore formed along the longitudinal center of said piston.

The piston 5 is as will be appreciated from FIG. 1 slidably disposed in a large diameter bore formed in the body or housing 4. Slidably and sealingly disposed through a first end wall of the servo motor housing is a actuating rod member 18. The end of the rod which is inserted into the large diameter bore carries a pin 19 disposed therethrough for slidable engagement with a guide slot 20 formed in the end of the piston 5. Slidably disposed in the stepped bore formed in the piston 5 is a spool 21 which has a first land 22 and a second land 23 formed thereon. A third land (no numeral) is also formed on the spool near the end thereof. A through passage or elongated bore 25 is formed through the spool to permit fluid communication between the both ends. A small bore 25a is formed through the side wall of the spool to permit fluid communication between the elongated bore 25 and the space defined between the second and third lands. The end of the spool 21 on which the third land is formed is arranged to be urgable into a chamber 24 which will for the purpose of explanation be referred to as the small chamber hereinafter. The small chamber is formed in the form of a bore in the end of the piston which is most remote from the end abutable by the actuating rod 18. One end of the small chamber is closed by the end of the spool carrying the third land and the other is closed by a second actuating rod 14 which is screwed into a thread formed on the inner surface of said bore of the small chamber. Disposed between the end of the second actuating rod 14 and the end of the spool 21 is a spring 26 arranged to urge the spool to a first position which will be referred to as a dormant position. The other end of the second actuating rod 14 is arranged similarly to the (first) actuating rod 18 to slidably and sealingly project through the end of the servo motor body or housing 4. Although not shown in the Figs. the exposed end of the actuating rod 18 is connectable to a brake pedal or linkage connected thereto and the exposed end of the second actuating rod 14 connectable to a master cylinder which in turn is connected to the actuating cylinders of the vehicle brakes.

Now as clearly shown in FIG. 1 a drain channel 27 is formed through the body of the piston 5 parallel to the axis of the small chamber. The first end of this channel opens into a chamber 7 defined in the large diameter bore formed in the servo motor housing by a sealing end member 13, through which the second actuating rod 14 passes, disposed in the end of the large diameter bore and the end of the piston 5 slidingly disposed in same. This chamber 7 will be referred to as the drain chamber hereinafter. It will be noted at this point that the drain chamber 7 is fluidly connected to the conduit 10c interconnecting the power steering mechanism and the pump via a conduit 28. Also disposed in the drain chamber 7 is a spring 15 which has one end thereof abutted against the sealing end member 13 and the other against the end of the piston 5 which faces the sealing end member to bias the piston away from the sealing end member. The second end of the aforementioned drain channel 27 is arranged to communicate with the space defined between the second and third lands formed on the spool when said spool is in the aforementioned dormant position and closable by the second land 23 when urged from said dormant position.

Defined between the other end of the piston, i.e., the end operatively connected to the actuating rod 18 and the end wall of the servo motor housing (through which the actuating rod 18 is slidably disposed) within the large diameter bore is a chamber 6 which will be referred to as the main chamber hereinafter.

Figure 2B:
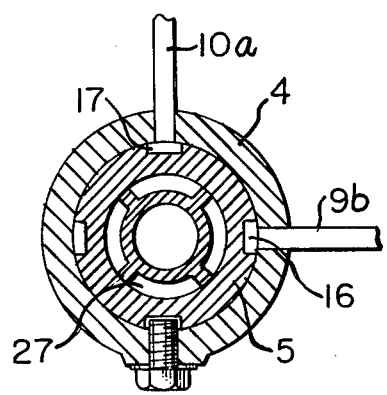
FIG. 2b is a sectional view of the servo motor of the system of FIG. 1 taken along the section line B—B of FIG. 1.

As shown in FIG. 2a a bore 16' is formed through the wall of the piston to communicate the aforementioned channel like recess 16 with the annular space defined about a portion of the first land 22. Now as seen in FIG. 1 the aforementioned annular space communicates freely with a space defined between the first and second lands 22 and 23 when the spool 21 is in the dormant position. Formed on the first land 22 is a chamber which, when the spool 21 is urged from the dormant position, reduces the amount of communication between the annular space referred to earlier and the space between the first and second lands by approaching a step portion formed in the bore in which the spool is disposed. Upon being urged sufficiently far, the outer peripheral edge of the chamfer passes the aforementioned step portion i.e. at a preselected position to cut communication between the annular space and the space between the first and second lands 22 and 23. A pair of bores 17' are formed through the wall of the piston 5 adjacent the above mentioned step portion to transmit the fluid entering the aforementioned annular space and the space between the first and second lands to a pair of channel like recesses 17 formed as best seen in FIGS. 2a and 2b. The upper channel fluidly communicates with the conduit 10a which in turn fluidly communicates with the aforedescribed spool valve 30. The lower channel communicates with a normally closed port (shown closed by a bolt screwed sealingly thereinto). The channels 17 are elongated as shown so that the piston is permitted to travel without cutting communication between the conduit 10a and the conduit 9b (which are communicated via elongate channels 16 and 16', bores 17' and the chamber formed in the spool 21 into which the aforementioned bores open).

The operation of the above described construction is as follows. The pump 1 is driven by a source of power such as an internal combustion engine or the like of the motor vehicle in which the power assisted braking and steering system according to the present invention is employed. The pressurised fluid emitted from the pump is fed to the spool valve 30 via conduit 9a and into the chamber 30b whereupon the spool 30a is urged to the first predetermined position against the biasing force of the spring 39. Simultaneously the pressurised fluid passes through the restriction 36 through the first passage 33 formed in the spool 30a and into the conduit 9b. The pressurised fluid is then simultaneously fed to the accumulator 3 through the conduit 40 and check valve 41. It should be noted at this time that the check valve is arranged to function as a pressure release valve in the event that an excessive amount of pressure is present in the accumulator 3, as well as its one way function.

The pressurised fluid entering the channel 16 connected with the conduit 9b flows therealong to enter the bores 16' and the annular chamber or space and subsequently into the space defined between the first and second lands 22 and 23. The just described flow of pressurised fluid is permitted if spool 21 is in the aforementioned dormant position. Now if the spool 21 remains in the dormant position the pressurised fluid is permitted to circulate via the aforementioned flow path through the bores 17', elongated channels 17, conduit 10a, spool valve 30 and conduit 10b to the power steering mechanism 43 and then via conduit 10c to the pump for recirculation. At this time the pressure in the main chamber 6 the small chamber 24 and the drain chamber 7 are equal, each being communicated with each other via elongated bore 25, small bore 25a and drain passage 27 and simultaneously isolated or cut off from the supply of pressurised fluid fed to the servo motor via conduit 9b, the first and second lands 22a and 23 respectively preventing the pressurised fluid in the aforedescribed annular space and the space between the first and second lands to pass therefrom anywhere else but through the bores 17', i.e. the pressurised fluid cannot enter the main chamber 6 past the land 22 nor the small chamber 24 and annular drain passage 27 past the land 23.

However upon pressing on the brake pedal the actuating rod 18 is urged into contact with the spool 21 to urge same through a distance to open and permit the passage of pressurised fluid from the annular space into the main chamber. It will be appreciated that the aforementioned passage of pressurised fluid is permitted before the end of the actuating rod 18 contacts the piston 5. At this time due to the displacement of the spool 21 within the stepped bore the communication between the small chamber and the drain passage 27 is cut off by the second land 23 moving to close the opening thereof. Hence the pressure which is rapidly building in the main chamber is transmitted through the elongate bore 25 to the small chamber 24 but no further. The aforementioned pressure in the main chamber urges the piston 5 to move against the biasing force of the spring 15 to thus in turn urge the second actuating rod 14 to activate the master cylinder to which it is attached. Thus as long as the driver continues to press the brake pedal with sufficient force to overcome the biasing force of the spring 26 the power assisted or power braking function will continue and the piston will be urged by the continuously increasing volume of pressurised fluid in the main chamber toward its limit of travel. At the same time pressurised fluid is continued to be fed although at a slightly lower rate through the now reduced area between the chamber formed on the first land 22 and the aforementioned stepped portion of the bore in which the spool 21 is disposed. Hence the power steering mechanism still receives an adequate supply of pressurised fluid during the filling of the main chamber with same.

Upon release of the brake pedal the spool 21 is allowed to return to its dormant position within the piston 5 whereupon the supply of pressurised fluid into the main chamber is stopped and the fluid therein is permitted to drain through the elongate bore 25, small bore 25a, drain channel 27, drain chamber and conduit 28 back to the pump. The draining of the fluid is assisted by the spring 15 which rapidly urges the piston back to its normal position.

Under severe braking the spool 21 will be urged a little further than normal, i.e., beyond the preselected distance, into the stepped bore by the increased force transmitted from the brake pedal under these conditions, to temporarily cut communication between the annular space and the space between the first and second lands 22 and 23 to direct all of the available pressurised fluid into the main chamber to very rapidly fill same. Thus only a momentary loss of power steering is experienced while very rapid response to emergency braking is ensured.

Now should the pump 1 fail, the pressure in the chamber 30b of the spool valve 30 will drop rapidly and the spring 39 will urge the spool 30a to the second predetermined position whereupon connection between the passage 37b and the conduit 9b is cut, and communication between the conduit 45 and the conduit 9b is established via the third passage 35. The communication between the conduits 10a and 10b is cut as previously described.

Hence under the above described conditions the accumulated pressurised fluid in the accumulator is fed via the conduit 45, passage 35, and conduits 42 and and 9b to the servo motor and the previously described operation is repeatable. However as the braking operations continue the reserve of pressurized fluid will be depleted thus making each successive operation more difficult than the previous one. (i.e. requiring more manual effort) Simultaneously the power steering function having disappeared will immediately alert the driver to the fact that the pump has ceased to function and immediate action must be taken or suffer the loss of power braking as well as power steering. The ever increasing effort required to initiate normal braking also provides the driver with means of estimating and thereby preparing for, the time when power assistance will disappear altogether.

What is claimed is:

1. A hydraulic system for a motor vehicle comprising:

pump means for supplying pressurized fluid;
  servo motor means fluidly connected to said pump for receiving pressurized fluid therefrom;
  pressure accumulator means for accumulating pressurized fluid therein;
  power steering means fluidly communicated with the servo motor means for receiving pressurized fluid therefrom, said servo motor means being so constructed and arranged as to be operable by the pressurized fluid fed thereto; and
  valve means fluidly connected to the pressure accumulator means and interposed between the servo motor means and the pump, said valve means being so constructed and arranged as to be sensitive to the pressure of the pressurized fluid from the pump so that when the pump means functions normally, said valve means establishes fluid communication between the servo motor means and the pump means and fluid communication between said servo motor means and said power steering means, while when the pump fails, said valve means cuts-off the fluid communication between the servo motor means and the pump means and cuts-off the fluid communication between said servo motor means and said power steering means and establishes fluid communication between the servo motor means and the pressure accumulator means wherein said valve means is fluidly connected to the pump for receiving pressurised fluid therefrom through a first conduit interconnecting the pump and the valve means;
  said accumulator means for accumulating pressurised fluid therein is connected to the valve means through third and fourth conduits, said third conduit being fluidly connected to a second conduit, said second conduit and third conduit thus being connected to the valve means for receiving pressurised fluid therefrom thereinto, and said fourth conduit being connected to the valve means which is so constructed and arranged that it maintains connection between said first and second conduits only while the pressurised fluid is fed from the pump and connects only the fourth and second conduits when the supply of pressurised fluid from the pump ceases so that the pressurised fluid in the accumulator means is fed to the second conduit;
  said servo motor means is connected by the second conduit to the valve means for receiving pressurised fluid therefrom, said servo motor being operatively connected to and interposed between a master cylinder of a braking system and a brake pedal and fluidly connected through seventh and eighth conduits to the pump for returning the spent pressurised fluid thereto; and
  said power steering means is fluidly connected to the servo motor means by fifth and sixth conduits, said fifth and sixth conduits fluidly communicating through said valve means, said valve means permitting fluid communication between said fifth and sixth conduits when pressurised fluid is fed from the pump and cutting-off said communication when the supply of pressurised fluid from the pump ceases, and connected to the pump for returning spent pressurised fluid thereto through the seventh conduit.

2. A system as claimed in claim 1 wherein said valve means comprises:

a spool having a first and a second end slidably disposed in a blind bore formed in the body of the valve means;
  first, second and third passages formed through the spool substantially at right angles to and passing through the axis of the spool;
  biasing means disposed in the first end of said bore and arranged to abut a first end of the spool to bias it from a first predetermined position wherein it abuts stopper means formed in the bore to limit the travel of the spool against the spring, to a second predetermined position, said first predetermined position being such that said first and second conduits and fifth and sixth conduits are communicated via the first and second passages respectively and said second predetermined position being such that only said fourth and said second conduits are communicated through said third passage;
  a chamber defined in the bore between the second end of the spool and the second end of the bore which is fluidly connected to the first conduit for the introduction of pressurised fluid from the pump thereinto, the pressure of the pressurised fluid being arranged to overcome the biasing force of the spring to urge the spool to said first predetermined position while the pump is operating normally; and
  restriction means arranged so as to restrict the flow of pressurised fluid only between said first and second conduits and maintain a pressure equal to that present in the first conduit in said chamber.

3. A system as claimed in claim 1 wherein accumulator means comprises:

a pressurised fluid accumulator and a check valve operatively disposed in said third conduit.

4. A system as claimed in claim 1 wherein said servo motor means comprises:

a piston slidably disposed in a large diameter bore formed in the housing of the servo motor to define a main chamber between a first end of the piston and an end wall of the housing and a drain chamber between the second end of the piston and a sealing end member sealingly disposed in the end of the large diameter bore, said drain chamber being fluidly connected to the pump via said eighth conduit;

spool valve means slidably disposed in a stepped bore formed in the piston which is arranged to direct the pressurised fluid introduced into the servo motor means through said second conduit to said fifth conduit when said spool valve means is in a dormant position and simultaneously isolate the main chamber and the drain chamber from said second conduit; said main chamber and said drain chamber being in constant communication when in the dormant position, the arrangement of the above being such that communication between said second and fifth conduits is normal when said spool valve means is in the dormant position, reduced when the spool valve means is between the dormant position and a preselected position and cutoff when the spool valve means is urged to and beyond the preselected position, communication between the main chamber and the second conduit is established when the spool valve means is moved from the dormant position toward and beyond said preselected position and the communication between the main chamber and the drain chamber is cutoff when the spool valve means is moved from said dormant position toward and beyond said preselected position;

first actuator means slidably and sealingly disposed through the end wall of the servo motor means arranged to be movable by the brake pedal to abuttingly engage the end of the spool valve means to move it from said dormant position to establish said fluid communication between the main chamber and the second conduit whereupon the pressurised fluid introduced into said main chamber urges the piston toward the sealing end member against the biasing force of biasing means disposed between the piston and the sealing end member and second actuating means fixedly connected to the second end of the piston and arranged to be slidingly and sealingly disposed through the sealing end member and operatively connected with a master cylinder of the brake system;

the arrangement of all of the foregoing being such that in the event of no fluid pressure being supplied through the second conduit the first actuator means is abutable with the first end of the piston to urge it against the biasing force of the spring disposed in the drain chamber between the second end of the piston and the sealing end member to manually operate the master cylinder operatively connected to the second actuating means.

5. In a hydraulic system;
a first source of hydraulic fluid under pressure;
a second source of hydraulic fluid under pressure;
a hydraulically operable device;
a valve body formed with first passage means extending between a first inlet port and a first outlet port, second passage means extending between a second inlet port and said first outlet port, said first outlet port communicating with said hydraulically operable device, said first inlet port communicating with said first source and said second inlet port communicating with said second source, and a bore arranged to intersect said first passage means and said second passage means;

a spool valve reciprocally received in said bore and axially movable between first and second positions, said spool valve being so constructed and arranged that, in said first position thereof said first passage means is open to permit fluid communication between said first inlet port and said first outlet port and said second passage means is closed to fluidly isolate said second inlet port and said first outlet port, while in said second position of said spool valve said first passage means is closed and said second passage means is open;

spring means for biasing said spool valve toward said second position; and chamber means communicating with said first source for biasing said spool valve against the bias of said spring means toward said first position thereof in response to the supply of fluid under pressure from said first source into said chamber means.

6. A hydraulic system as claimed in claim 5, wherein said hydraulically operable device includes an outlet port and wherein said valve body comprises a third inlet port, a second outlet port and third passage means extending between said third inlet port and said second outlet port, said third inlet port communicating with said outlet port of said hydraulically operable device, said spool valve being so constructed and arranged that in said first position thereof said third passage means is open and in said second position thereof said third passage means is closed.

7. A hydraulic system as claimed in claim 5, wherein said chamber means includes a chamber and a passage opening into said first passage means at a first location intermediate of said spool valve and said first source, said first passage means being provided with flow restriction means at a second location between said first location and said spool valve.

8. A hydraulic system as claimed in claim 5, wherein said second source is connected across said second inlet port and said first outlet port for accumulating hydraulic fluid under pressure discharged from said first source therein while said spool valve is in said first position thereof, said second source including a one way check valve interposed between it and said first outlet port, said check valve permitting the transmission of hydraulic fluid therethrough from said first outlet port to said second source only.

9. A valve for applying hydraulic fluid under pressure to a hydraulically operable device from an auxiliary source of hydraulic fluid under pressure upon failure of a main source of hydraulic fluid under pressure, comprising:

a valve body including a bore, a first inlet port adapted to communicate with the main source, a second inlet port adapted to communicate with the auxiliary source, a first outlet port adapted to communicate with the device, a pair of first and second passages, said first passage extending from said first inlet port to said bore, and said second passage extending from said bore to said first outlet port, and a pair of third and fourth passages, said third passage extending from said second inlet port to said bore, and said fourth passage extending from said bore to said second passage;

a spool valve received in said bore and being slidable axially between a first position in which fluid communication between said first and second passages is established and fluid communication between said third and fourth passages is cut off and a second position in which said fluid communication between said first and second passages is cut off and the fluid communication between said third and fourth passages is established;

said spool valve defining at one end thereof a chamber within said bore;

flow restrictor means disposed in said first passage;

said valve body further including a passage leading from a portion of said first passage, between said flow restrictor means and said first inlet port, to said chamber;

yieldable means disposed within said bore for biasing said spool valve toward said second position thereof when the pressure within said chamber is below a predetermined level; and an effective surface area of said spool valve exposed to the pressure in said chamber for urging said spool valve against the biasing force of said yieldable means to said first position when the pressure in said chamber is above said predetermined level.

* * * * *